United States Patent [19]

Britz et al.

[11] 4,013,157
[45] Mar. 22, 1977

[54] BONUS PLAY MACHINE

[75] Inventors: John A. Britz, Palatine; Richard M. Weissman, Chicago, both of Ill.

[73] Assignee: Bally Manufacturing Corporation, Chicago, Ill.

[22] Filed: July 30, 1975

[21] Appl. No.: 600,309

[52] U.S. Cl. .................. 194/1 N; 194/15; 273/138 A

[51] Int. Cl.² ........................ G11B 19/08

[58] Field of Search .............. 194/1 N, 9, 10, 15, 194/DIG. 11; 273/138 R, 138 A, 143

[56] References Cited

UNITED STATES PATENTS

| | | | |
|---|---|---|---|
| 2,717,781 | 9/1955 | Reykjalin | 194/15 X |
| 3,263,788 | 8/1966 | Jensen et al. | 194/15 X |
| 3,642,287 | 2/1972 | Lally et al. | 273/143 R |

*Primary Examiner*—Robert B. Reeves
*Assistant Examiner*—Joseph J. Rolla
*Attorney, Agent, or Firm*—Hill, Gross, Simpson, Van Santen, Steadman, Chiara & Simpson

[57] ABSTRACT

A coin operated music machine which permits persons purchasing musical selections on the machine the opportunity of making additional selections over and above the amount of records and playing time to which he would be entitled by the deposit of coins into the machine. After the initial coin has been deposited into the machine, the player is offered the opportunity to make an additional coin deposit for which he may receive additional plays in addition to those purchased by the two coins. The right to receive the "Bonus Play" will be indicated on the machine but the player need not exercise the right to such play and can reject it by merely selecting the recordings which have been purchased by the deposit of the first coin. If the player decides to utilize the "Bonus Play" he will always receive the normal number of selections for the second coin but may additionally receive extra plays above the normal number of selections for a coin.

12 Claims, 5 Drawing Figures

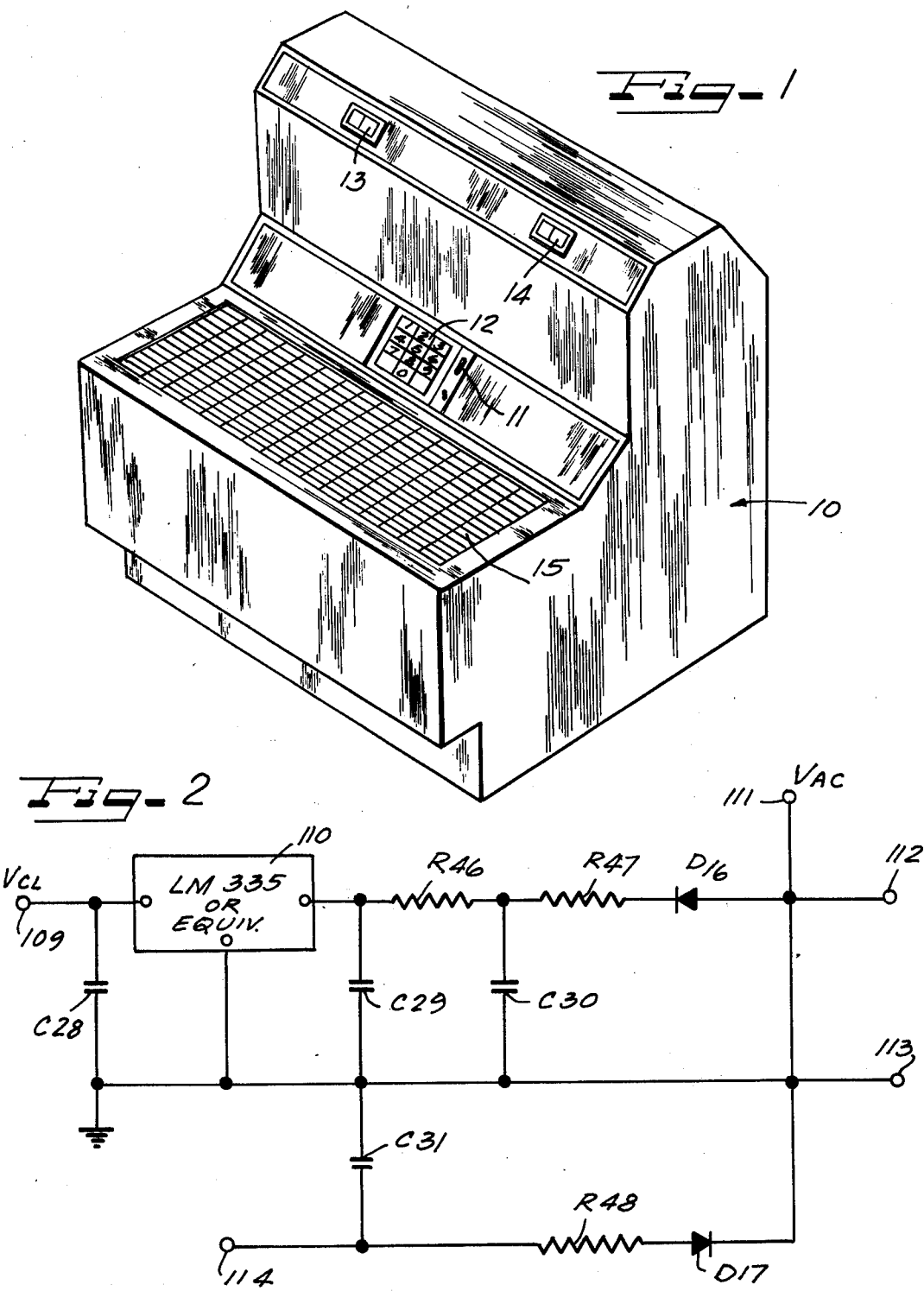

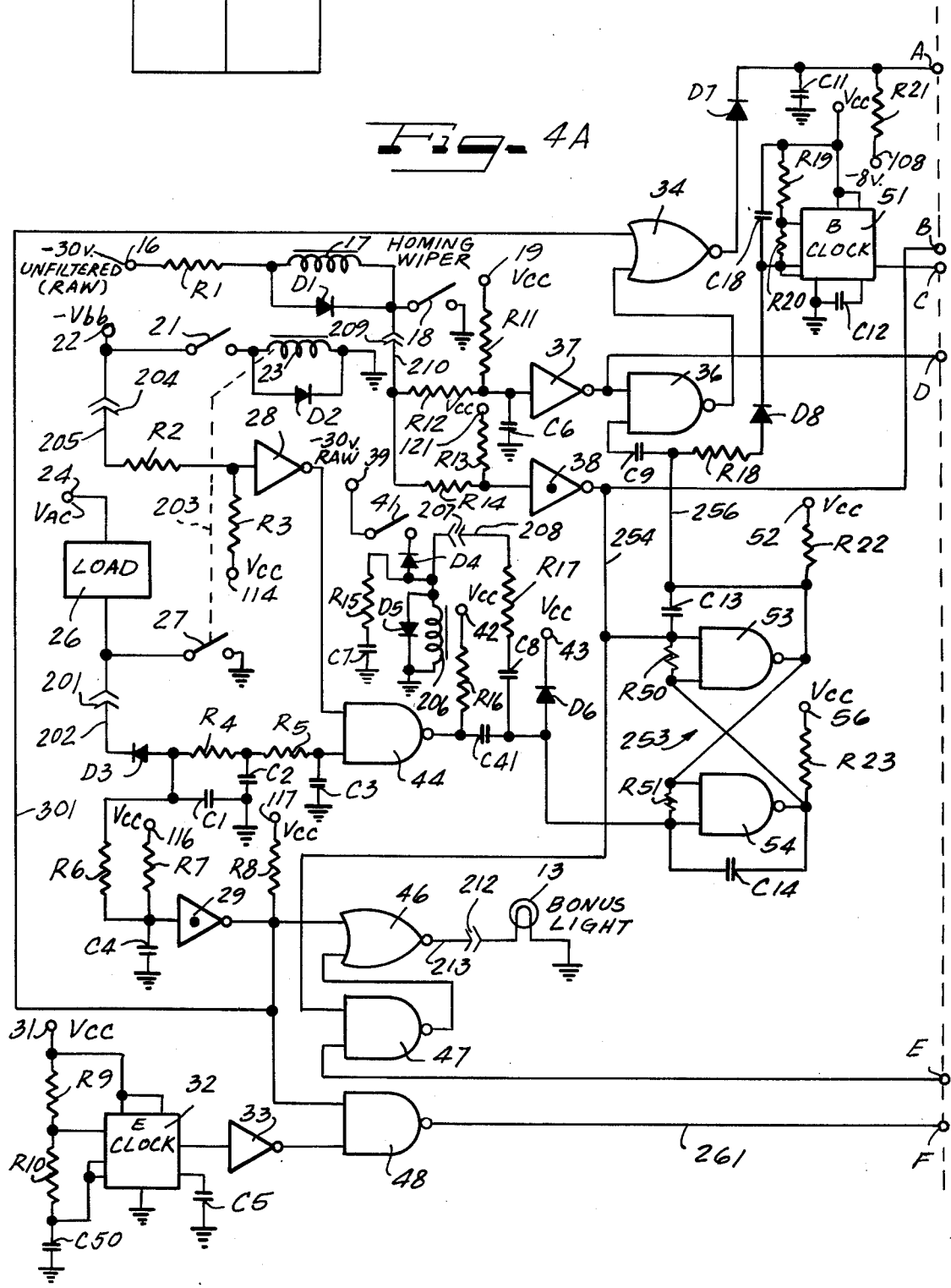

BONUS PLAY MACHINE

BACKGROUND OF THE INVENTION

1. Field of the Invention

This invention relates in general to music machines of the commonly known "Juke Box" type.

2. Description of the Prior Art

Conventional juke boxes dispense two or more plays upon the deposit of one of more coins totalling a fixed amount. For example, a juke box may give two selections for 25 cents. However, such prior art machines do not have the "Bonus Feature" of the present invention.

SUMMARY OF THE INVENTION

The present invention relates to a coin operated machine, as for example, a coin operated music machine in which a player can for a fixed sum receive one or more selections to be played. In the present invention, when the coins for the initial selection have been deposited a "bonus indicator" will in randomly selected instances be energized which will indicate to the player that if the player chooses to do so that by placing a second fixed amount of coins in the machine he will receive at least the full number of selections for the first and second amounts placed into the machines and he may receive in addition bonus plays, as for example, two, four or six additional plays for the sum placed into the machine. The player then chooses to deposit the additional coins and receive the additional plays or alternatively he may ignore the bonus opportunity and make the selections for the initial coins placed into the machine. In any event, the player will receive at least the number of selections for which he has paid and if he makes the bonus play selection, he may receive a number of additional selections.

Other features, objects and advantages of the invention will be readily apparent from the following description of certain preferred embodiments thereof taken in conjunction with the accompanying drawings although variations and modifications may be effected without departing from the spirit and scope of the novel concepts of the disclosure, and in which

BRIEF DESCRIPTION OF THE DRAWINGS

FIG. 1 is a perspective view of a music machine illustrating the invention,

FIG. 2 is an electrical schematic illustrating a power supply for the invention, FIG. 3 illustrates the orientation of FIGS. 4A and 4B and FIGS. 4A and 4B illustrate the electrical schematic of the invention.

DESCRIPTION OF THE PREFERRED EMBODIMENTS

Figure 4B:
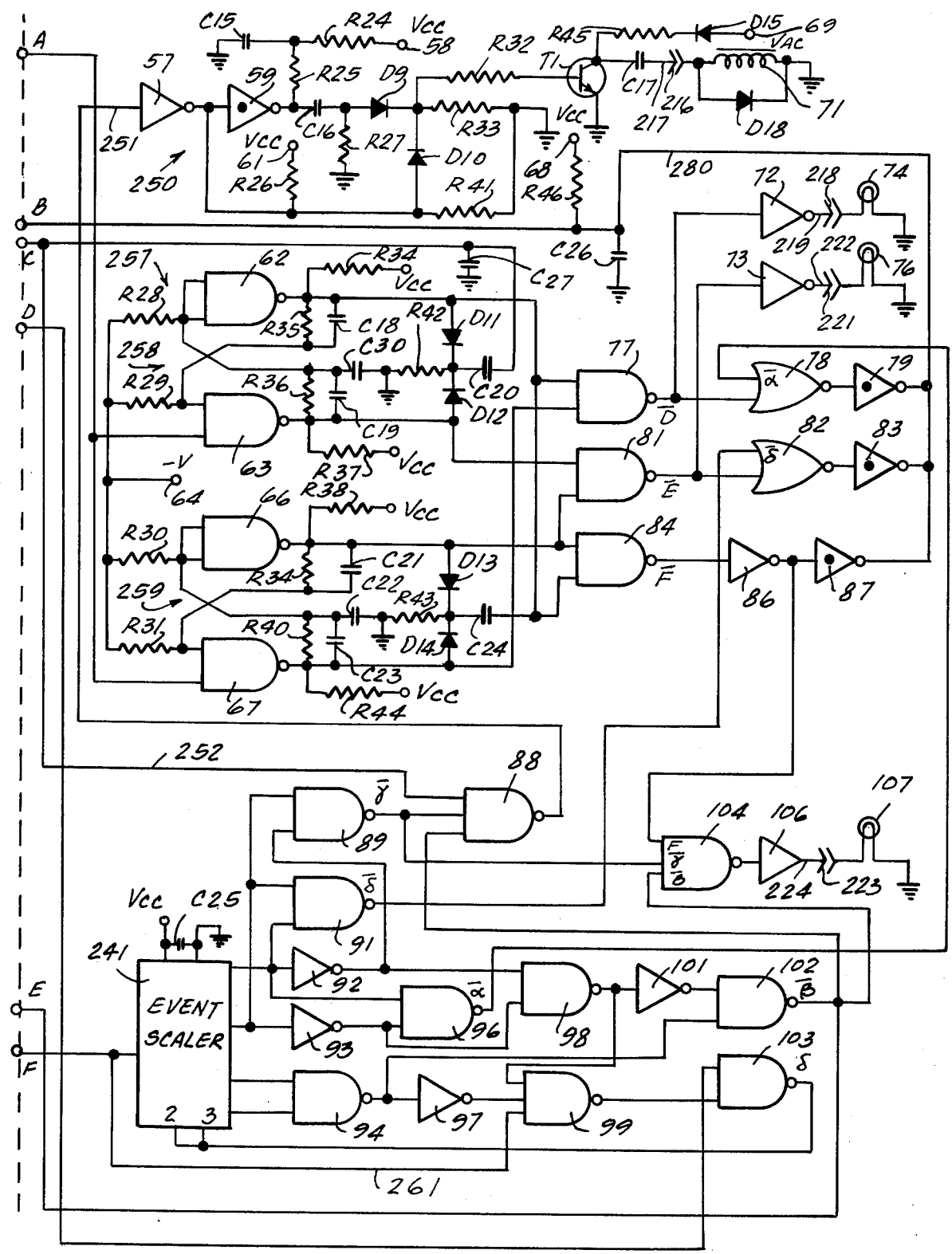

The present invention relates to a bonus play machine such as, for example, a juke box although it is to be realized that the invention is applicable to any coin operated machine.

Also, for simplicity of explanation of operation it will be assumed that for 25 cents or a quarter that the machine will play two selections. It is to be realized, of course, that the example of 25 cents for two selections is purely arbitrary and that machines may be set to play more or less than two selections for a quarter, however, such example is expedient for understanding the operation and construction of the invention.

In FIG. 1 is illustrated a music machine 10 which has a coin slot 11 and selector buttons 12. An area 15 of the machine lists the various selections of recordings from either records or tapes that are available. A bonus light 13 indicates to the user that he has the opportunity to obtain bonus plays and an indicator 14 indicates to the user the number of selections to be made.

A person wishing to play the machine first deposits a quarter in the slot 11 for which he will receive credit and the opportunity to select two plays. At random instances the "bonus light 13" will turn on. If the bonus light 13 does not turn on the player can then make his two selections by depressing the selector buttons 12 and the machine will start operation, or he may insert a second quarter with the knowledge that he will receive only two additional selections. If the "bonus light" comes on after the initial quarter is placed in the machine, the player may choose to place a second quarter into the coin slot 11 before making his initial selections for the first quarter and the following events occur:

1. He receives at least two additional plays for the second quarter or a total of four plays for the two quarters which he has placed in the machine.

2. He may receive a bonus of two, four, or six additional plays in addition to the four for which he has paid and the number of plays he has received will be indicated by the indicator 14. Then the player may made selections by depressing the selector buttons 12 until he has selected the total number of selections for which he has received credit on the machine.

In any event, he will receive at least credit for two selections per quarter and may receive additional bonus plays. Furthermore, if the player initially places a 50 cent coin in the coin slot 11 he will automatically operate the bonus feature of the machine and may receive plays in addition to the four plays for which the 50 cent coin receives credit.

The electrical schematic of the invention is illustrated in FIGS. 2, 3, 4A and 4B. Electrical schematic 4A and 4B illustrate the interface with the existing circuit of conventional juke box machines and disclose the additional circuitry required to obtain the features of the present invention.

These various interfaces of the invention to existing circuitry of conventional music machines are indicated in the electrical schematic of FIG. 4A and 4B by double arrows. For example, a first double arrow 201 shows a connection of the invention at lead 202 to the zero credit switch 27 of the machine which is open when zero credit condition exits in the machine. When credits exist in the machine the switch 27 is closed grounding the load 26 which has its other side connected to an AC voltage at terminal 24. An electro-mechanical linkage 203 connects the zero credit switch 27 to the 25 cent coin switch 21 which momentarily is closed each time a quarter is placed in the machine. The switch 21 is connected to an interface 204 which is connected to a lead 205 of the invention. The switch 21 has one side connected to voltage terminal 22 and the other side connected through a ratchet coil 23 to ground. The ratchet coil 23 is in parallel with a diode D2. An interface 207 connects from lead 208 of the invention to the fifty cent coin switch 41 in the music machine. The other side of the switch 41 is connected to a voltage terminal 39 so that when the switch 41 is closed by the deposit of a 50 cent coin into the machine the voltage will be applied from the terminal 39 through diode D4 to a ratchet coil 206 which has its other side grounded.

A resistor R15 and capacitor C7 are connected through the diode D4 in parallel with the diode D5 and the ratchet coil 206. An interface 209 connects lead 210 of the invention to a homing wiper switch 18 which indicates when selections have been made. The switch 18 has one contact connected to ground and its other contact connected to relay 17 which is in parallel with diode D1 and the other side of relay 17 is connected through resistor R1 to a voltage source terminal 16. An interface 212 connects lead 213 of the invention to a bonus light 13 mounted on the front panel of the machine 10 as shown in FIG. 1. The other side of the bonus light 13 is connected to ground. As shown in electrical schematic FIG. 4B an interface 216 connects lead 217 of the invention to the master ratchet coil 71 of the machine which is in parallel with the diode D18. The other side of the coil 71 is connected to ground. The master ratchet coil 71 gives credit each time it is pulsed for plays by the machine.

An interface 218 connects lead 219 of the invention to an indicator light 74 which is turned on when two bonus plays have been obtained. An interface 221 connects lead 222 of the invention to a bonus light 76 which indicates when four bonus plays have been received. An interface 223 connects lead 224 of the invention to an indicator light 107 which indicates when six bonus plays have been received.

If it be assumed that the machine has no credit and it is in a stand-by condition the zero credit switch 27 will be open which will cause a gate 48 to be enabled thus allowing the output of a clock 32 to be supplied through an inverter 33 to the gate 48 and the output of the clock will be supplied to the event scaler 241 which may be a type 7493 by Texas Instrument or other manufacturer. The event scale 241 continuously counts due to the input from the clock 32 through 13 states over and over and has forced reset so that it will re-cycle after 13 states.

When a 25 cent coin is inserted into slot 11 the 25 cent coin switch 21 is momentarily closed. This closes zero credit switch 27 due to the mechanical linkage 203 which grounds the input voltage at lead 202, thus, stopping the event scaler 241 because the gate 48 will have been closed. The event scaler 241 will stop in one of its 13 states. Three of the thirteen states will represent "no bonus feature" and the logic of the circuitry of the invention is such that if any of these three states exist after the insertion of the coin in slot 11, the bonus light 13 will not be energized through the gate 46. The three states of the event scaler 241 which represents the "no bonus feature" are defined as the beta condition.

For the other ten conditions of the event scaler 241 (10 out of 13) the bonus light 13 will be turned "on" indicating that the bonus feature condition exits.

The other conditions of the scaler may be designed by the gamma condition which means that "no bonus is obtained", the alpha condition which means that two extra selections are obtained, the delta condition which indicates four extra selections are obtained and the epsilon condition which indicates that six extra selections are obtained.

The master ratchet coil 71 in the machine advances the credit coils such that one additional play of the machine is obtained each time the master ratchet coil 71 is energized. The master ratchet coil 71 is connected through the interface 216 to lead 217 and through a capacitor C17 to the output of a transistor T1 which has its emitter connected to ground and its collector connected to a suitable bias source applied through resistor R45 and the diode D15. The base of transistor T1 is connected through resistor R32 to the output of a frequency doubler circuit 250 comprising an inverter 57 which receives an input on lead 251 and supplies an output to an inverter 59 which is connected through capacitor C16 and diode D9 to resistor R32. A resistor R33 is connected between the diode D9 and ground. A resistor R41 is connected between the output of inverter 57 and ground. A bias voltage is applied to terminal 61 and through resistor R26. A diode D10 is connected between resistor R26 and resistor R32. Thus, any time an output pulse is supplied to lead 251 the master ratchet coil 71 of the music machine will be advanced two selections due to the action of the frequency doubler 250 which converts the single pulse on lead 251 into two pulses.

The output lead 251 is connected to output of NAND-gate 88. The NAND-gate 88 receives as inputs the output from clock 51 as well as an output from NAND-gate 89 which indicates not gamma and an output from NAND-gate 102 which indicates not beta.

A flip-flop circuit 253 comprises a pair of NAND-gates 53 and 54 which have their outputs connected to the inputs of the other and each of which receives biasing voltages from voltage $V_{CC}$ at terminals 52 and 56 through resistors R22 and R23, respectively. A forced reset lead 254 is connected to the input terminals of the NAND-gates 53 and 54 comprising the flip-flop 253 and an enable line 256 from the flip-flop 253 enables the B-clock 51 through the lead 256, resistor R18 and diode D8.

The clock 51 drives two different elements, one directly and one conditionally. It directly drives a slow scaler designated the B-scaler 257 comprising the two flip-flops 258 and 259 which is a scale of four counter. In the case where the event scaler 241 has stopped in the alpha, delta, or epsilon state, the B-clock 51 also drives the frequency doubler 250 through the gate 88 to energize the master ratchet coil 71 as discussed above.

Once the slow flip-flop 253 has set, it enables the drive to the B-scaler 257 which was initially in the zero state. It is kept in the zero scale or (1) zero credit condition, (2) selection made condition, and momentarily set to zero by the edge trigger on the set of the slow flip-flop 253 on the pulse rise.

The B-scaler 257 is slowly pulsed until the slow flip-flop 253 is reset. The slow flip-flop 253 is reset on (1) matched condition, (2) an epsilon or six credit state or (3) a selection made state.

The matched condition occurs when one of the four possible states of the B-scaler 257 matches the setting of the event scaler 241. In other words, match can be made on a alpha condition which will give two extra plays or a delta condition which will give four extra plays. Otherwise the B-scaler counts up to its maximum count of three and locks up. If it locks up in three condition, this is frequency doubled by the frequency doubler 250 to six additional plays.

The B-scaler 257 stops as soon as a match occurs.

The event scaler 241 is reset when a selection is made by depressing the selection buttons 12 which turns out the bonus light and this can be accomplished by placing the scaler 241 into the beta state.

If a 50 cent coin is placed into the coin slot 11, switch 41 in the machine will be closed and the player will receive the bonus feature as though he had put in two quarters in sequence.

The event scaler 241 is connected to not gamma NAND-gate 89 not delta NAND-gate 91, inverter 92, inverter 93, NAND-gate 94 and not alpha NAND-gate 96. The output of gate 94 is connected to not beta NAND-gate 102 and to inverter 97 which supplies an output to NAND-gate 99 which has its output connected to NAND-gate 103. The output of NAND-gate 103 is connected to the reset terminals 2 and 3 of the event scaler 241. The gate 99 also receives an input from lead 261 which is the output of NAND-gate 48. NAND-gate 96 has its output connected to the input of NOR gate 78, The output of not beta gate 102 is connected to the not beta input of NAND-gate 104 which has its output connected to inverter 106 to drive the six play credit indicator light 107 and to an input of NAND-gate 88 to inhibit credit pulses for the beta state of the event scaler. The output of gate 96 is connected to an input of NOR gate 78 which has its output connected to inverter 79 and its output is connected by lead 280 to the forced reset lead 254 of the slow flip-flop 253.

The NAND-gate 77 is connected to the B-scaler 257 and produces an output which is supplied to NOR gate 78 and to inverter 72 to energize indicator light 74 when two additional plays are obtained under the bonus condition. NAND-gate 81 is connected to the B-scaler 257 and supplies an input to NOR gate 82 and to inverter 73 to drive the four extra play indicator light 76. The NAND-gate 84 receives an output of the B-scaler 257 and has its output connected to inverter 86 which has a first output connected to the NAND-gate 104 which has its output connected to the inverter 106 to drive the six extra play indicator light 107. The output of inverter 86 is also connected to the input of inverter 87 which is connected to the outputs of inverters 79 and 83 and to the forced reset lead 280 which connects to the forced reset lead 254 of the slow flip-flop circuit 253.

NOR gate 82 also receives an input from not delta gate 91. NAND-gate 98 receives inputs from inverter 92 and NAND-gate 94. NAND-gate 98 supplies outputs to NAND gate 99 and to inverter 101 which connects to gate 102.

The interface from homing switch 18 indicates when selection of numbers has been made and supplies signals through inverters 37 and 38. Inverter 38 is connected to lead 254 for reset of flip-flop 253.

Inverter 37 is connected to NAND-gate 36. Gate 36 supplies an input to NOR gate 34 which also receives an output from lead 301 connected to the output of inverter 29 and the input of gate 48.

The output of gate 34 is connected through diode D7 to gates 63 and 67 of flip-flops 258 and 259.

Inverter 37 is also connected to gate 103.

Gate 47 receives inputs from lead 254 and from not beta gate 102 and supplies an output to NOR gate 46 which drives bonus light 13.

Switch 21 connects through resistor R2 to inverter 28 which supplies an input to NAND gate 44 which supplies an input to NAND-gate 54 through capacitor C41. The fifty cent switch 41 is also connected to gate 54 through resistor R17 and capacitor C8.

Although the invention has been described with the logic arrangement of FIGS. 4A and 4B which illustrate a preferred embodiment, it is to be realized that many different arrangements which could be electrical or mechanical could be designed to provide the bonus feature of the invention.

FIG. 2 illustrates a power supply for the invention which has a first terminal 113 which is connected to machine ground of the music machine 10 and a second input terminal 112 which receives 25 volt AC from the machine 10. A diode D16 is connected from terminals 111 and 112 to a resistor R47 which has its other side connected to a resistor R46 which is connected to a circuit which may be a type LM 335 or equivalent designated by 110 and which has an output terminal 109 at which a $V_{CC}$ voltage of about 5 volts may appear. A capacitor C28 is connected from terminal 109 to ground and a pair of capacitors C29 and C30 are connected from ground to opposite sides of the resistors R46. Output terminal 114 is connected to a capacitor C31 and to one side of resistor R48. A diode D17 is connected between resistor R48 and terminal 113.

Thus, it is seen that the present invention provides a simple and novel circuit which allows a player to decide under certain conditions whether he wishes to insert an additional coin into the machine so as to possibly obtain bonus plays of the machine in addition to the normal number of plays for which the coins have paid. In any event, the player will receive a standard number of plays from the coins and he may receive two, four or six extral plays extra bonus plays depending upon the condition of the event scaler 241 when he deposits the second coin. Alternatively, the player will receive the bonus feature if he deposits a fifty cent coin. The player can, of course, deposit a single coin and ignore the bonus feature and make his selection by depressing the selector button 12 for normal operation of the machine.

Although the invention has been described with respect to preferred embodiments, it is not to be so limited as changes and modifications may be made which are within the full intended scope as defined by the appended claims.

We claim as our invention:
1. A bonus play arrangement for a currency operated machine including:
   a currency receiving switch actuated by currency deposited in said machine;
   a credit circuit connected to said currency receiving switch and giving a fixed credit when the deposit of a first fixed currency amount is made;
   a random event generator controlled by deposit of currency in said currency receiving switch and having a plurality of output conditions;
   a bonus indicator connected to said random event generator to indicate a bonus condition upon the deposit of a first fixed currency amount; and
   enabling means connecting said credit circuit to said random generator upon the deposit of a second fixed currency amount to give a fixed credit that can not be lost plus bonus credit if the random event generator is in a bonus credit condition, said bonus credit being given in addition to the accumulated fixed credit that has been purchased by said first and second fixed currency amounts.

2. A bonus play machine according to claim 1 wherein said plurality of output conditions of said random event generator include no bonus and bonus conditions.

3. A bonus play machine according to claim 2, wherein said plurality of ouput conditions of said random event generator include a plurality of bonus conditions such as zero and *n*, where *n* is an integer.

4. A bonus play machine according to claim 1 wherein said enabling means is energized when said coin switch is energized successively by the deposit of *n* times said fixed currency amount where *n* is an integer.

5. A bonus play machine according to claim 4 including a selector switch connected to said enabling means and preventing bonus credit when said selector switch is actuated after the deposit of a single fixed currency amount.

6. A bonus play machine according to claim 5 including a bonus feature indicator connected to said coin actuated switch to indicate bonus feature condition.

7. A bonus play arrangement for a currency operated machine including:
- a currency receiving switch actuated by currency deposited in said machine;
- a credit circuit connected to said currency receiving switch and giving a fixed credit upon the deposit of a first fixed currency amount;
- a random event generator controlled by the deposit of currency in said currency receiving switch and having a plurality of output conditions;
- said plurality of output conditions of said random event generator including no bonus and bonus conditions;
- said plurality of output conditions of said random event generator further including a plurality of bonus conditions such as zero and *n*, where *n* is an integer;
- a bonus indicator connected to said random event generator to indicate a bonus condition upon the deposit of a first fixed currency amount;
- enabling means connecting said credit circuit to said random generator upon the deposit of a second fixed currency amount to give bonus credit if the random event generator is in the bonus condition;
- a clock;
- a first gate between said random generator and said clock; and
- said currency receiving switch coupled to said first gate to stop said random event generator in one of its plurality of output conditions when said first fixed currency amount is deposited.

8. A bonus play machine according to claim 7 wherein said enabling means includes a second gate with its output connected to said credit circuit and receiving an output from said random event generator to provide bonus credit corresponding to the output condition of said random event generator.

9. A bonus play machine according to claim 8 including a switch which is actuated when selections are made and connected to said enabling means to prevent bonus credit after a selection has been made until zero credit condition exists.

10. A bonus play machine according to claim 8 wherein said enabling means includes a second clock connected to said second gate.

11. A bonus play machine according to claim 10 including a frequency doubler means connected between said second gate and said credit circuit.

12. A bonus play machine according to claim 11 including a second scaler circuit comprising a pair of flip-flops capable of at least three output conditions, third, fourth and fifth gates connected to the random event scaler and the second scaler circuit and a plurality of indicators respectively connected to the outputs of said third, fourth and fifth gates.

* * * * *